(12) United States Patent
MacKinnon et al.

(10) Patent No.: US 7,108,402 B2
(45) Date of Patent: Sep. 19, 2006

(54) APPARATUS AND METHODS RELATING TO PRECISION CONTROL OF ILLUMINATION EXPOSURE

(75) Inventors: Nicholas B. MacKinnon, Vancouver (CA); Ulrich Stange, Vancouver (CA)

(73) Assignee: Tidal Photonics, Inc., Vancouver (CA)

( * ) Notice: Subject to any disclaimer, the term of this patent is extended or adjusted under 35 U.S.C. 154(b) by 31 days.

(21) Appl. No.: 10/951,438

(22) Filed: Sep. 27, 2004

(65) Prior Publication Data

US 2005/0213181 A1    Sep. 29, 2005

Related U.S. Application Data

(60) Provisional application No. 60/506,120, filed on Sep. 26, 2003.

(51) Int. Cl.
| F21V 17/02 | (2006.01) |
| F21V 9/00 | (2006.01) |
| G02F 1/03 | (2006.01) |
| G02F 1/29 | (2006.01) |
| G02B 26/00 | (2006.01) |

(52) U.S. Cl. .............. 362/321; 362/293; 359/259; 359/261; 359/239; 359/316

(58) Field of Classification Search ............ 362/321, 362/293; 359/261, 259, 239, 316
See application file for complete search history.

(56) References Cited

U.S. PATENT DOCUMENTS

| 4,848,880 A | * | 7/1989 | Aull et al. ................. 359/261 |
| 5,233,459 A | * | 8/1993 | Bozler et al. .............. 359/230 |
| 6,356,378 B1 | * | 3/2002 | Huibers .................... 359/291 |
| 6,369,933 B1 | * | 4/2002 | O'Callaghan .............. 359/247 |
| 6,437,919 B1 | | 8/2002 | Brown et al. |
| 6,490,017 B1 | | 12/2002 | Huang et al. |
| 6,618,184 B1 | * | 9/2003 | Jin et al. ................... 359/291 |
| 6,781,691 B1 | | 8/2004 | MacKinnon et al. |
| 7,019,908 B1 | * | 3/2006 | van 't Spijker et al. .... 359/619 |

OTHER PUBLICATIONS

International; Search Report, PCT/CA2004/001752, Feb. 16, 2005.

* cited by examiner

Primary Examiner—Renee Luebke
Assistant Examiner—David Makiya
(74) Attorney, Agent, or Firm—Graybeal Jackson Haley LLP (57) ABSTRACT

Illumination exposure control systems comprising reflective pixelated spatial light modulators that reflect substantially all of the light impinging on them into at least two different light paths. At least one of the light paths acts as a propagating light path and transmits the light beam out of the lighting system. At least one other light path acts as a non-propagating light path and prevents the light beam from being transmitted out the system. The illumination exposure control systems provide high speed of exposure actuation and precision control of exposure duration and frequency or exposure sequences.

20 Claims, 6 Drawing Sheets

APPARATUS AND METHODS RELATING TO PRECISION CONTROL OF ILLUMINATION EXPOSURE

CROSS-REFERENCE TO RELATED APPLICATIONS

The present application claims priority from pending U.S. provisional patent application No. 60/506,120 filed Sep. 26, 2003.

BACKGROUND

It is often necessary to illuminate objects, scenes, tissue or biological samples, chemical compositions and other items with light for the purpose of capturing an image, making a measurement, or initiating a chemical or biological reaction. For all of these purposes it is important to control the amount of light illuminating the object or scene. The most common ways to control the amount of illumination are by varying the output energy of the source of illumination or controlling the duration of illumination.

For many sources of illumination it is not practical or possible to vary the output energy. For other sources the output energy can be varied but without adequate precision.

Shutters are the most common method of controlling the amount of illumination by controlling the duration of illumination. Shutters are well known and control the duration of illumination of imaging sensors as well as the duration of illumination of an object or scene being imaged.

A shutter is a device that has two states—open and closed. In the open state it allows light to propagate along an optical path. In the closed state it blocks the optical path and prevents light from propagating. In other words, shutters open to let light through and close to keep the light out. Typical shutters may be mechanical, electromechanical or solid-state. Electromechanical shutters are often operated under microprocessor control to determine the duration of their opening and closing.

In many applications illumination needs to be turned on and off repeatedly at high speed. For these applications a shutter with multiple apertures arranged circularly in a spinning disk is often used. Such a shutter is commonly known as a "chopper wheel". A problem with chopper wheels is that it is impossible to vary the duration of exposure without changing the frequency of exposure and vice versa.

A problem with digital light processors (DLPs, also known as pixelated spatial light modulators (SLMs)) has been their lack of contrast. While most of the energy impinging on the array of mirrors is controllably reflected by the mirrors of the DLP, a small amount of the light is imperfectly reflected by the small deformations in the mirrors and by impinging on the electrical and mechanical components between and below the mirrors. This results in a small amount of undesired light scattering from these surfaces and along the propagating path. The contrast ratio of these devices has historically been about 400:1. Recent improvements have raised the contrast ratio to about 1000:1. The quality of the contrast ratio is very dependent on the angle at which light impinges on the DLP and can be reduced when light strikes at multiple angles.

Thus, a limitation of using single DLPs as shutters is that they still pass a small amount of light even when turned "off" making them unsuitable for a number of applications.

In many applications currently available electromechanical shutters cannot provide sufficient speed of actuation or precision of duration. One reason for this is that many electromechanical shutters comprise metal leaves that are moved by the action of small solenoids, triggered by electrical signals. Although these components are small and light they have a certain amount of inertia that must be overcome, before they can be moved to block or unblock the passage of light. While this time is short, there is a finite amount of time that must pass while the shutter transitions between opened and closed states. This limits the precision of many of these types of shutter when exposure times approach 100 milliseconds ($\frac{1}{10}$ of a second) or less.

This also limits the shortest exposure time that can be practically achieved.

One attempt to provide this level of exposure control has been to use a solid-state device such as a liquid crystal as a shutter. Liquid crystals can change their polarization in response to an electrical signal. When polarized light is directed onto the crystal it passes through the liquid crystal when the liquid crystal has the same polarization, but is blocked when the polarization is in an orientation that opposes the passage of light.

Liquid crystal shutters require that the illumination light impinging on them be polarized to be controllable which reduces the output power of many sources, and furthermore makes them unsuitable for applications where polarized light is not desirable. Liquid crystal shutters tend to overheat because they must also absorb the light that they do not pass, and therefore have the disadvantage of having to manage the dissipation of the absorbed light, making them unsuitable for many applications where higher power light sources are required.

There has gone unmet a need for a shutter to precisely control the exposure time of illumination, that operates at high speed, that is not limited to polarized light and that can accommodate higher power light sources. The present invention provides these and other advantages.

SUMMARY

The present invention provides very precise, very rapid shutters. The shutters provide illumination exposure or other exposure control systems that precisely control of speed and duration of light beams used for illumination or other non-imaging applications.

The invention comprises methods, apparatus, systems, etc., that accept a first beam of light from a source of illumination and direct it onto a pixelated spatial light modulator (SLM). Desired light from the pixelated SLM is collected and directed toward a second pixelated SLM. The first and second (or more) pixelated SLMs may be separate devices or they may be separate areas of the same device. Light from the second pixelated SLM is collected and forms a downstream beam of light, which can be referred to as a post-shutter light beam, that is directed out of the illumination exposure control system.

The first pixelated SLM reflects or otherwise rejects substantially all of the light impinging on the SLM into at least two different light paths. In certain embodiments, at least one of the light paths does not reflect back to the light source and acts as a propagating light path that transmits light from the first to the second pixelated SLM. The other light path acts as the non-propagating light path(s) and can direct the reflected energy to a repository or an alternate propagation light path. If desired, none of the different light paths from the first or second SLMs reflect back to the light source.

The second pixelated SLM reflects substantially all of the light impinging on the pixelated SLM into at least two different light paths. At least one of the light paths does not reflect back to the first pixelated SLM and acts as a propagating light path that transmits light out of the illumination exposure control system. The other light path(s) acts as at least one non-propagating light path and can direct the reflected light energy to a repository, to a detector or otherwise as desired.

A pixelated spatial light modulator is typically a square or rectangular device (although other shapes are possible) that contains a large number of tiny pixels that can be turned on or off at will. Turning some pixels "on" while turning all others "off" permits the spatial light modulator to control whether light impinging on that portion of the pixelated SLM is configured to propagate. Propagation may also be controlled by directing light to a different path using a movable mirror or mirrors as in a micro electromechanical system (MEMS) device such as a digital light processor (DLP) manufactured by Texas Instruments Corporation.

In some embodiments, the DLPs are reflective devices such as digital micromirror devices or liquid crystal on silicon (LCOS) devices, as opposed to transmissive devices such as pixelated liquid crystal diodes or pixelated microshutters, so they do not have the problem of absorbing most of the unpropagated energy. They are fast and are commercially reliable.

A way to improve the contrast ratio is to use two or more DLP surfaces in sequence. In this way the contrast ratio of the first DLP surface is multiplied by the contrast ratio of the second DLP surface. Thus, a DLP with a contrast ratio of 1000:1 can be used to create a shutter with a theoretical contrast ratio of about 1000000:1, although in practice other factors can reduce this to achievable contrast ratios of lesser magnitude e.g. 100,000:1. Five to six orders of magnitude of light blocking is sufficient for most applications. If further blocking is desired further DLP surfaces can be utilized.

Because the mirrors in the pixelated SLM can be rapidly switched back and forth between different light paths, the reflected light beam can be alternated back and forth between a propagating light path and non-propagating light path, or between two or more different propagating light beams.

Exposure control systems comprising pixelated SLMs are a low cost, effective approach to providing carefully controlled light exposure times for a variety of purposes such as capturing an image, making a measurement, or initiating a chemical or biological reaction.

The pixelated SLM may be operably connected to a controller, which controller contains computer-implemented programming that controls the on/off pattern of the pixels in the pixelated SLM. The controller can be located in any desired location to the rest of the system. For example, the controller can be either within a housing of a luminaire containing the SLM shutters herein or otherwise maintained proximate to the SLMs, or it can be located remotely, connected by a wire, fiber optic cable, cellular link or radio link to the rest of the system. If desired, the controller, which is typically a single computer but can be a plurality of linked computers, a plurality of unlinked computers, computer chips separate from a full computer or other suitable controller devices, can also contain one or more computer-implemented programs that provide specific illumination characteristics, i.e., specific desired durations and frequency of illumination exposure.

The durations and frequency of exposure may be periodic, controllably varied, or they may be arbitrary sequences as appropriate for the application. For example, the light exposure for a complex chemical reaction may require different durations of illumination at different times during the course of the reaction.

In one aspect, the present invention provides an illumination exposure control system that provides a variable selected exposure time and a variable selected interval between exposures. The illumination control system comprises a light path that comprises:

a. if desired, an input configured to accept an illumination light beam from a light source traveling along the light path, b. a first pixelated SLM (such as a reflective pixelated SLM) located downstream from and optically connected to the light source, the pixelated SLM reflecting substantially all light impinging on the pixelated SLM and switchable to reflect or transmit light from the light beam between at least first and second light paths at least one of which does not reflect back to the light source; the first pixelated SLM can be a digital micromirror device or a liquid crystal on silicon device or other device as desired. The first pixelated SLM is operably connected to at least one controller that controls an on/off pattern of pixels in the pixelated SLM to reflect the beam of light to at least the first reflected light path or the second reflected light path, c. if desired, at least one optical element that directs the beam from the second, or desired, reflected light path to d. a second pixelated SLM located downstream from and optically connected to the first pixelated SLM, the pixelated SLM reflecting substantially all light impinging on the pixelated SLM and switchable to reflect light from the light beam between at least third and fourth light paths at least one of which does not reflect back to the first pixelated SLM; the second pixelated SLM can be a digital micromirror device, LCOS, microshutter, etc. The second pixelated SLM is operably connected to at least one controller that controls an on/off pattern of pixels in the pixelated SLM to reflect the beam of light to the third reflected light path or the fourth reflected light path. In some embodiments of the invention the first and second pixelated SLMs can be a first and second area of the same pixelated SLM, the first and second controller can be the same controller.

e. an output that accepts the light from the fourth, or other desired, light path and directs it out of the illumination control system as a desired or post-shutter light beam.

In some embodiments, the system further comprises a barrier that blocks light that does not travel in the second, desired reflective light path from traveling to the second reflective pixelated SLM. In some embodiments, this barrier may be a mirror or a prism array that reflects the unwanted light away from the second reflective pixelated SLM, or the barrier may be an absorbing element that absorbs the unwanted light energy, or it may be some other element that blocks the unwanted light.

In some embodiments of the invention the input light beam may be a beam of light that converges to a focus, or it may be a collimated beam, or it may be a diverging beam of light.

In some embodiments, the input port of the system further comprises optical elements that expand a narrow input light beam, such as a laser beam, so as to spread the energy in the beam over a larger area on the reflective pixelated SLMs, and the output port of the system further comprises optical elements that reshape the light beam into a narrow output beam.

In some embodiments, the input port of the system further comprises optical elements that focus or collimate the input beam; the output port of the system further comprises optical elements that focus or collimate the output beam; and, the optical element that directs the beam from the second reflected light path to the second reflective pixelated SLM may be a flat reflective surface, or it may be a curved reflective surface, or it may be a prism, or it may be another type of optical element that can shape and direct a light beam.

In some embodiments, there may be no optical element to direct the beam from the second reflected path. In this embodiment, the second reflective path proceeds directly to the second reflective pixelated SLM. In some embodiments, the system can further comprise a detector that samples the beam; the detector may provide useful feedback, e.g., on the timing of the illumination exposure control. In some embodiments, the controller may contain computer-implemented programming to control the on/off pattern of pixels in the reflective pixelated SLMs.

In another aspect, the present invention further comprises a light source located upstream from the input port. The light source may be a laser, a Xenon arc lamp, a mercury arc lamp, a tungsten filament lamp, a metal halide lamp, a fluorescent lamp, an infrared source, a gas discharge tube, a light emitting diode, or any other kind of light source that can be shaped into a light beam. These and other aspects, features and embodiments are set forth within this application, including the following Detailed Description and attached drawings. The discussion herein provides a variety of aspects, features, and embodiments; such multiple aspects, features and embodiments can be combined and permuted in any desired manner. In addition, various references are set forth herein that discuss certain apparatus, systems, methods, or other information; all such references are incorporated herein by reference in their entirety and for all their teachings and disclosures, regardless of where the references may appear in this application. Such incorporated references include: U.S. Pat. No. 6,781,691; pending U.S. patent application Ser. No. 10/893,132, entitled Apparatus And Methods Relating To Concentration And Shaping Of Illumination, filed Jul. 16, 2004; pending U.S. patent application Ser. No. 10/951,439, entitled Apparatus And Methods Relating To Color Imaging Endoscope Systems, filed contemporaneously herewith; pending U.S. patent application Ser. No. 10/951,448, entitled Apparatus And Methods Relating To Expanded Dynamic Range Imaging Endoscope Systems, filed contemporaneously herewith; pending U.S. patent application Ser. No. 10/951,449, entitled Apparatus And Methods For Performing Phototherapy, Photodynamic Therapy And Diagnosis, filed contemporaneously herewith; pending U.S. patent application Ser. No. 10/952,374, entitled Apparatus And Methods Relating To Enhanced Spectral Measurement Systems, filed contemporaneously herewith.

DETAILED DESCRIPTION

The present invention comprises illumination exposure control systems comprising at least at two pixelated spatial light modulators (SLMs) in series. The SLMs reflect or otherwise reject substantially all of the light from a light source, which light can be formed into a spectrum, and can be directed into at least two different light paths, at least one of which does not reflect back to the light source. At least one of the light paths acts as a propagating light path and transmits the light beam out of the lighting system. There can be least one other light path that acts as a non-propagating light path and prevents a non-desired light beam from being transmitted out of the system or causes such light beam to be transmitted along a different light path for other uses. The illumination exposure control systems provide high speed exposure actuation and precision control of exposure duration and frequency or exposure sequences.

The systems can be part of another system, a luminaire, or any other suitable light source.

Definitions.

The following paragraphs provide definitions of some of the terms used herein. All terms used herein, including those specifically described below in this section, are used in accordance with their ordinary meanings unless the context or definition indicates otherwise. Also unless indicated otherwise, except within the claims, the use of "or" includes "and" and vice-versa. Non-limiting terms are not to be construed as limiting unless expressly stated (for example, "including" and "comprising" mean "including without limitation" unless expressly stated otherwise).

A "controller" is a device that is capable of controlling a spatial light modulator, a detector or other elements of the apparatus and methods herein. A "controller" contains or is linked to computer-implemented programming. Typically, a controller comprises one or more computers or other devices comprising a central processing unit (CPU) and directs other devices to perform certain functions or actions, such as controlling the on/off pattern of the pixels in the pixelated SLM, the on/off status of pixels of a pixelated light detector (such as a charge coupled device (CCD), a charge injection device (CID) or a complementary metal-oxide semi-conductor (CMOS)), and/or compile data obtained from the detector, including using such data as feedback to control an upstream spatial light modulator. A computer comprises an electronic device that can store coded data and can be set or programmed to perform mathematical or logical operations at high speed. Controllers are well known in the art and selection of a desirable controller for a particular aspect of the present invention is within the scope of the art in view of the present disclosure.

A "spatial light modulator" (SLM) is a device that is able to selectively modulate light. The present invention comprises one or more spatial light modulators disposed in the light path of an illumination system. A pixelated spatial light modulator comprises an array of individual pixels, which are a plurality of spots that have light passing characteristics such that they transmit, reflect or otherwise send light along a light path, or instead block the light and prevent it or interrupt it from continuing along the light path. Such pixelated arrays are well known, having also been referred to as a multiple pattern aperture array, and can be formed by an array of ferroelectric liquid crystal devices, electrophoretic displays, or by electrostatic microshutters. See, U.S. Pat. Nos. 5,587,832; 5,121,239; R. Vuelleumier, Novel Electromechanical Microshutter Display Device, Proc. Eurodisplay '84, Display Research Conference September 1984.

A reflective pixelated SLM comprises an array of highly reflective mirrors that are switchable between at least an on and off state, for example between at least two different angles of reflection or between present and not-present. Examples of reflective pixelated SLMs include digital micromirror devices (DMDs), liquid crystal on silicon (LCOS) devices, as well as other microelectromechanical structures (MEMS). DMDs can be obtained from Texas Instruments, Inc., Dallas, Tex., U.S.A. In the DMD embodiment, the mirrors have three states. In a parked or "0" state, the mirrors parallel the plane of the array, reflecting orthogonal light straight back from the array. In one energized state, or a "−10" state, the mirrors fix at −10° relative to the plane of the array. In a second energized state, or a "+10" state, the mirrors fix at +10° relative to the plane of the array. Other angles of displacement are possible and are available in different models of this device. When a mirror is in the "on" position light that strikes that mirror is directed into the illumination light path. When the mirror is in the "off" position light is directed away from the illumination light path. On and off can be selected to correspond to energized or non-energized states, or on and off can be selected to correspond to different energized states. If desired, the light directed away from the projection light path can also be collected and used for any desired purpose (in other words, the DMD or other SLM can simultaneously or serially provide two or more useful light paths). The pattern in the DMD can be configured to produce two or more spectral and intensity distributions simultaneously or serially, and different portions of the DMD can be used to project or image along two or more different projection light paths.

An "illumination light path" is the light path from a light source to a target or scene, while a "detection light path" is the light path for light emanating to a detector. The light includes ultraviolet (UV) light, blue light, visible light, near-infrared (NIR) light and infrared (IR) light.

"Upstream" and "downstream" are used in their traditional sense wherein upstream indicates that a given device is closer to a light source, while downstream indicates that a given object is farther away from a light source.

The scope of the present invention includes both means plus function and step plus function concepts. However, the terms set forth in this application are not to be interpreted in the claims as indicating a "means plus function" relationship unless the word "means" is specifically recited in a claim, and are to be interpreted in the claims as indicating a "means plus function" relationship where the word "means" is specifically recited in a claim. Similarly, the terms set forth in this application are not to be interpreted in method or process claims as indicating a "step plus function" relationship unless the word "step" is specifically recited in the claims, and are to be interpreted in the claims as indicating a "step plus function" relationship where the word "step" is specifically recited in a claim.

Other terms and phrases in this application are defined in accordance with the above definitions, and in other portions of this application.

Figure 1:
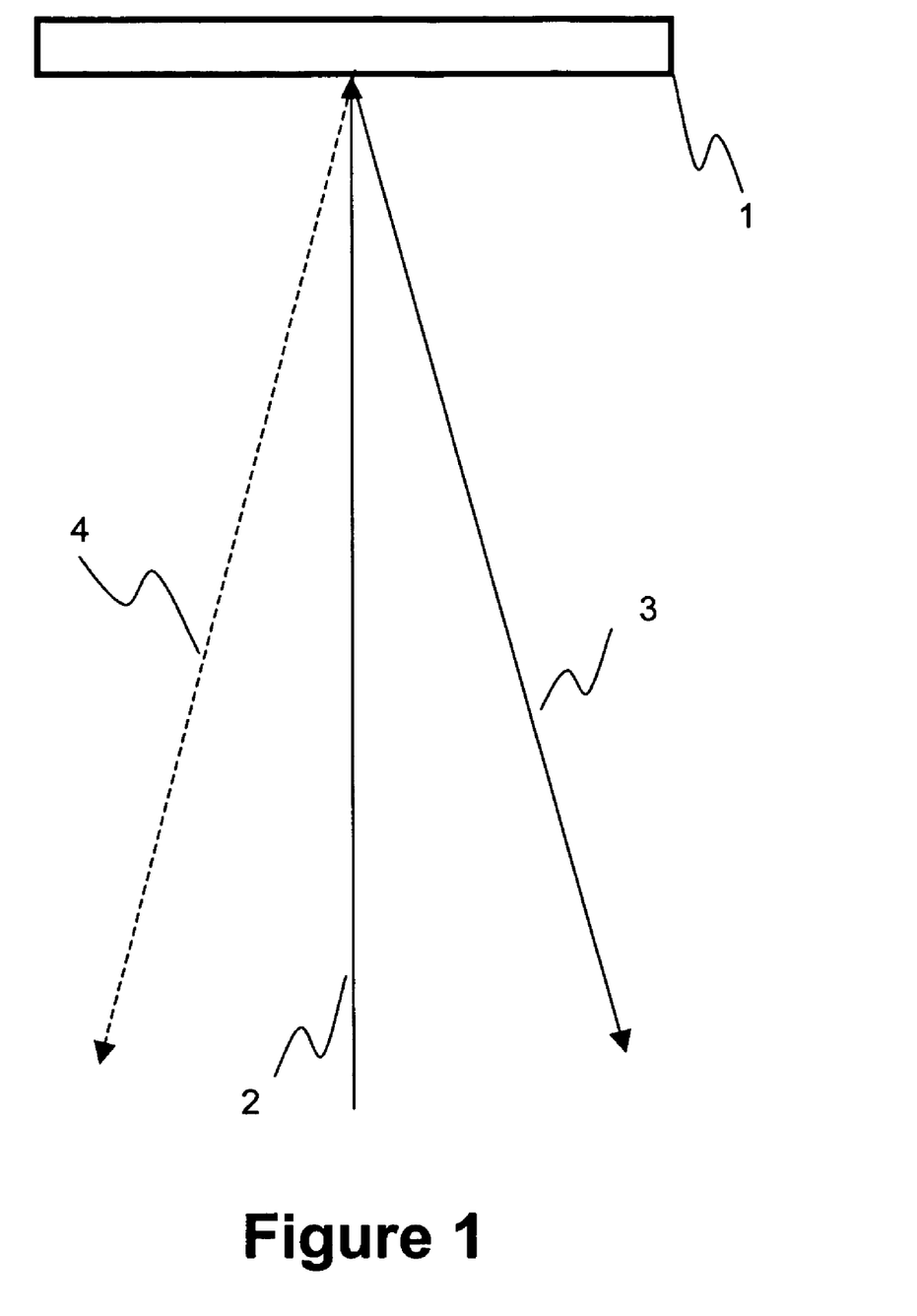
FIG. 1 provides a schematic depiction of a light beam being reflected in different directions by a digital micromirror device.

Turning to the figures, FIG. 1 schematically depicts an illumination exposure control system that provides light having a variable, selected exposure duration and frequency. A light source is disposed at an upstream end of an input port and emits a light beam 2 that enters the illumination exposure control system through the input port and is directed towards a reflective pixelated SLM 1.

Light beam 2 is reflected by the reflective pixelated SLM 1 and continues along the propagating light path 3 when the constituent mirrors in the SLM are in their "on" position. Light path 3 is directed towards the output port through which the light beam passes out of the system.

Light beam 2 is reflected by the reflective pixelated SLM 1 and continues along the non-propagating light path 4 when the constituent mirrors in the SLM are in their "off" position. In some embodiments, light path 4 is directed towards a repository such as a light trap where the light is absorbed and dissipated as heat or otherwise eliminated. In other embodiments, light path 4 is directed toward a detector that can provide useful feedback, e.g., on the timing of the illumination exposure control.

The reflective pixelated SLM 1 can be switched between a propagating light path 3 and a non-propagating light path 4 as desired.

In the embodiment shown, there are no enhancing optical elements in the light path; in other embodiments, light beam 2 or light beam 3 or light beam 4 may be shaped or conditioned or directed by optical elements that transmit or reflect the light. Any suitable optical elements can be employed, such as lenses, mirrors, filters for the focusing, expanding, collimating or other shaping or directing of the light beam that is desired. Thus, the light is passed by the enhancing optical elements either by transmitting the light or by reflecting the light or otherwise by acting upon the light.

Figure 2:
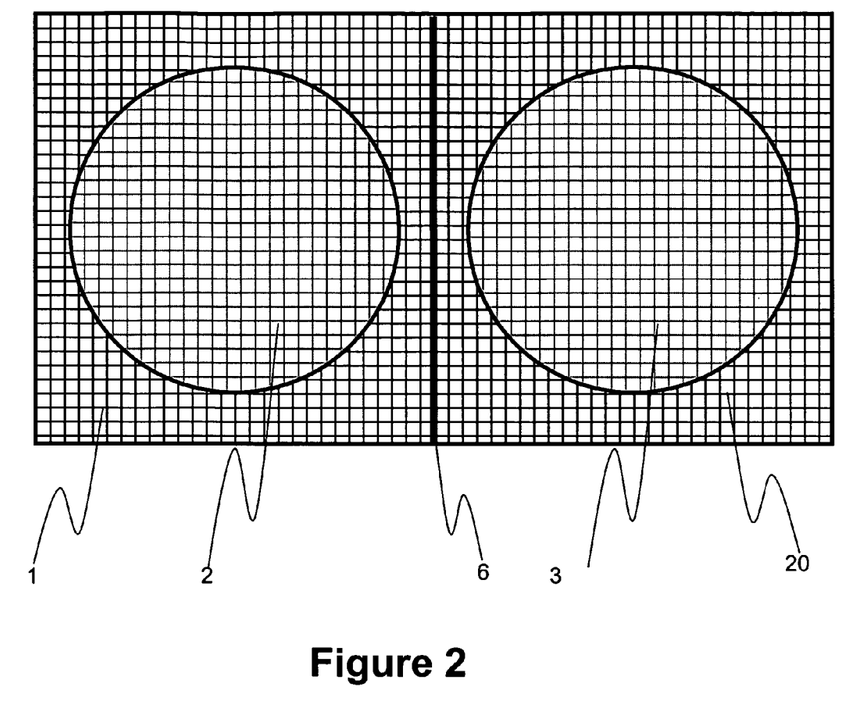
FIG. 2 provides a schematic depiction of an illumination exposure control system according to an embodiment comprising two pixelated SLMs formed by two separate areas on a single SLM device with the separation of the areas enhanced by a light blocking barrier.

In most embodiments, a second reflective pixelated SLM is located downstream from the first reflective pixelated SLM; this can provide an improved contrast ratio. FIG. 2 schematically depicts an embodiment of the first reflective pixelated SLM 1 and second reflective pixelated SLM 20 implemented as first and second surfaces on the same reflective pixelated SLM. The embodiment shown has a light barrier 6 between the two surfaces that is designed to prevent unwanted light traveling from the first to the second surface. In other embodiments, contrast ratio may be further improved by adding further reflective pixelated SLMs downstream from the first and second reflective pixelated SLM. In some embodiments, these further reflective pixelated SLMs may be implemented as separate surface areas on one or more reflective pixelated SLMs.

Figure 3:
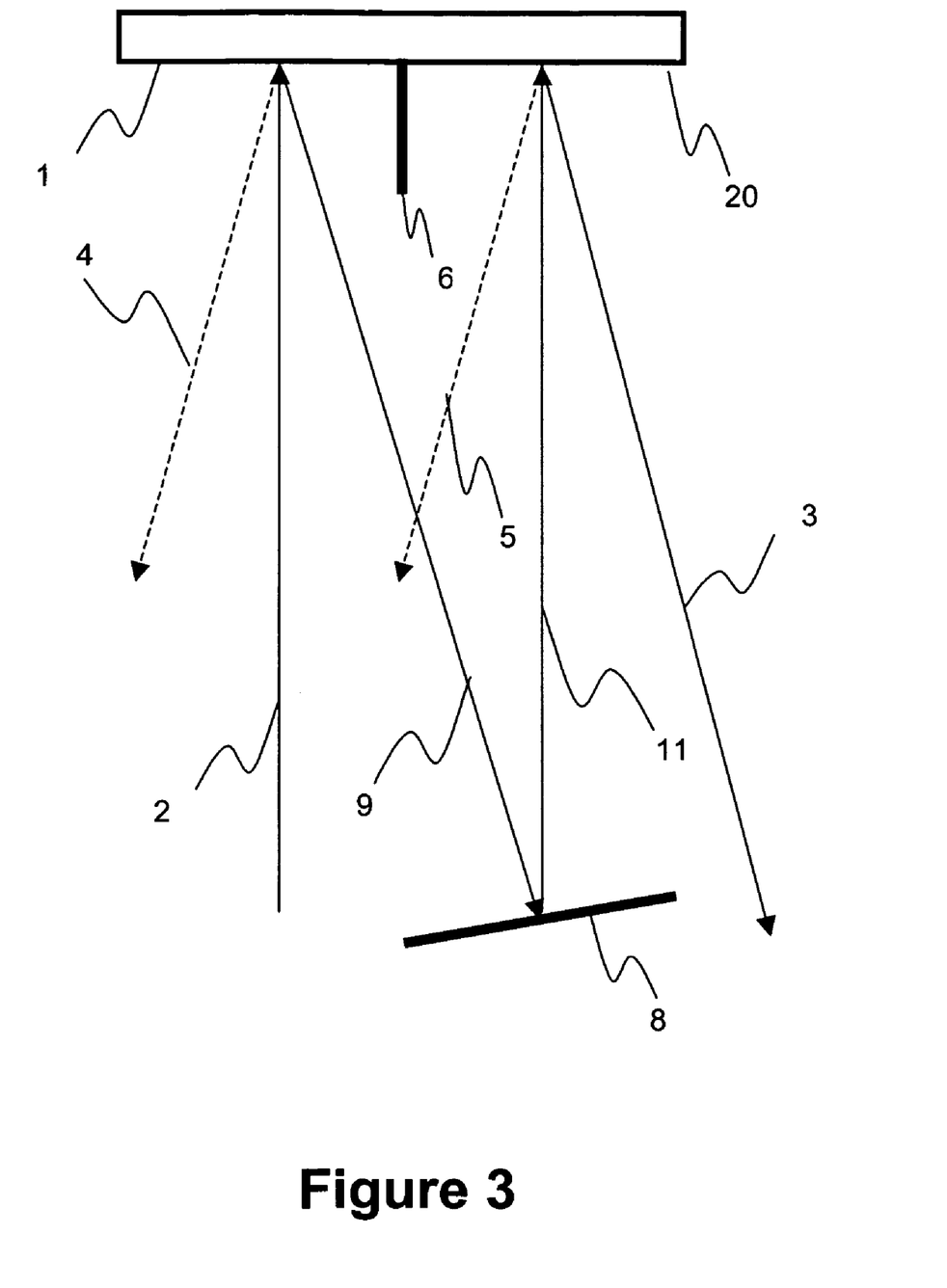
FIG. 3 provides a schematic depiction of an illumination exposure control system according to an embodiment comprising two pixelated SLMs formed by two separate areas on a single SLM device with the separation of the areas enhanced by a light blocker and the light beam directed from the first to the second area by means of a flat mirror.

FIG. 3 schematically depicts an embodiment where a second reflective pixelated SLM is located downstream from a first reflective pixelated SLM. In the embodiment shown, the two reflective pixelated SLMs are implemented as two separate surfaces on the same reflective pixelated SLM and the two surfaces are separated by a light barrier 6. The first reflective pixelated SLM 1 reflects light in a propagating light path 9 towards an optical element 8 that directs the light in light path 11 to the second reflective pixelated SLM 20. In the embodiment shown the optical element is a flat mirror. In other embodiments, the optical element may be a curved mirror or any other optical element or combination of optical elements that can redirect a light beam. The second reflective pixelated SLM 20 reflects the light in a propagating light path 3 toward the output port when the reflective elements in the SLM are in the "on" position and a non-propagating light path 5 when the reflective elements in the SLM are in the "off" position.

Figure 4:
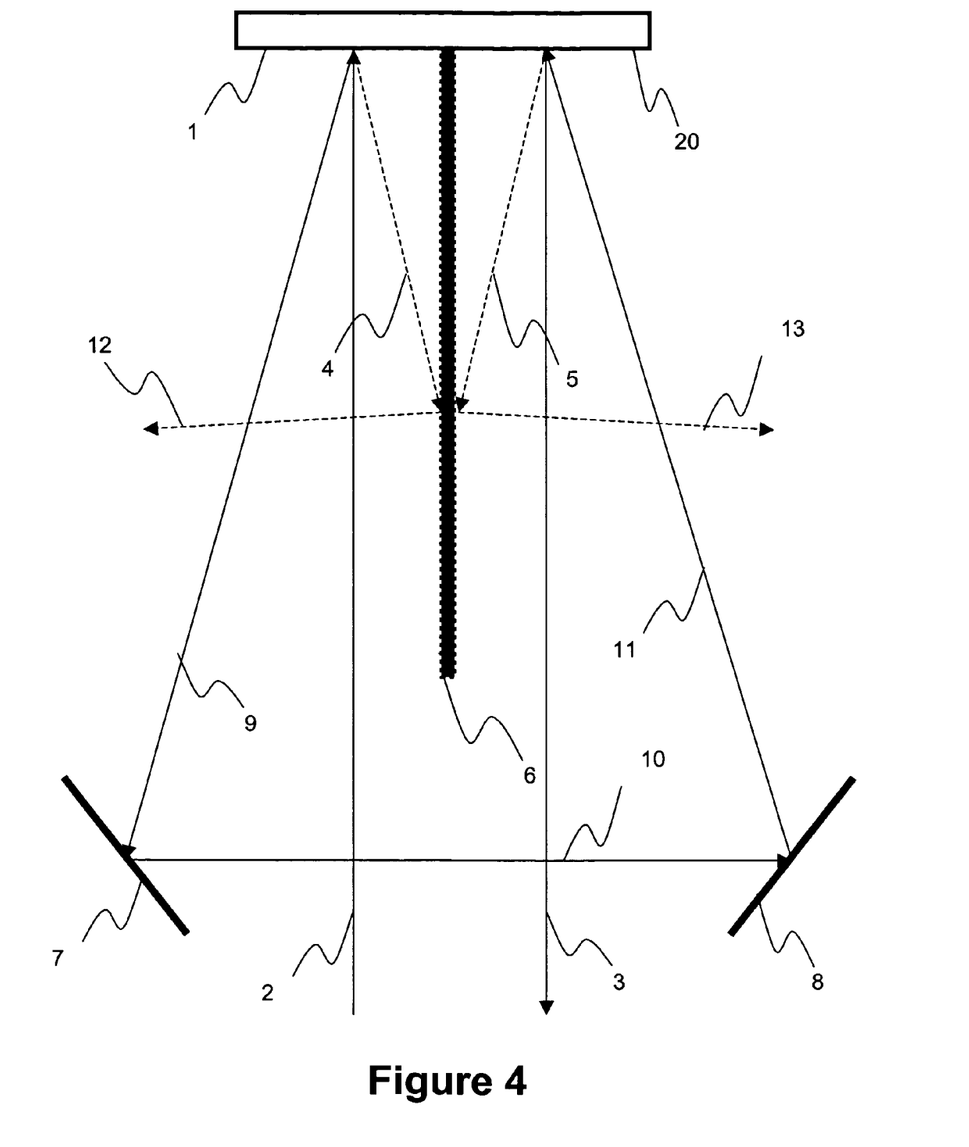
FIG. 4 is a schematic representation of an illumination exposure control system according to an embodiment comprising two pixelated SLMs formed by two separate areas on a single SLM device with the separation of the areas enhanced by a light blocking barrier comprising prism arrays that redirect the blocked light and the light beam directed from the first to the second area by means of two flat mirrors

FIG. 4 schematically depicts an embodiment with two reflective pixelated SLMs 1 and 20 implemented as two separate surfaces on the same SLM. In this embodiment, the propagating light path 9 reflected by the first reflective pixelated SLM 1 is directed toward optical element 7 that directs the beam into propagating light path 10 towards optical element 8. Optical element 8 directs the light into propagating light path 11 towards the second reflective pixelated SLM 20. In this embodiment, the optical elements 7 and 8 are flat mirrors. In other embodiments, these optical elements can be prisms, curved mirrors or any other optical element or combination of elements that can direct the light path from light path 9 to light path 11. In this embodiment the two surfaces 1 and 20 are separated by a light barrier 6 comprising a reflective prism array; other light barrier materials and configurations such as at least one column turned to the "off" position can also be used. The light barrier 6 reflects the non-propagating light path 4 reflected by the first reflective pixelated SLM 1 to the non-propagating light path 12. The light barrier also reflects the non-propagating light path 5 reflected by the second reflective pixelated SLM 20 to the non-propagating light path 13. The non-propagating light paths 12 and 13 travel in directions that miss the optical elements 7 and 8 to ensure that substantially none of the light in the non-propagating light paths joins the propagating light paths.

Figure 5:
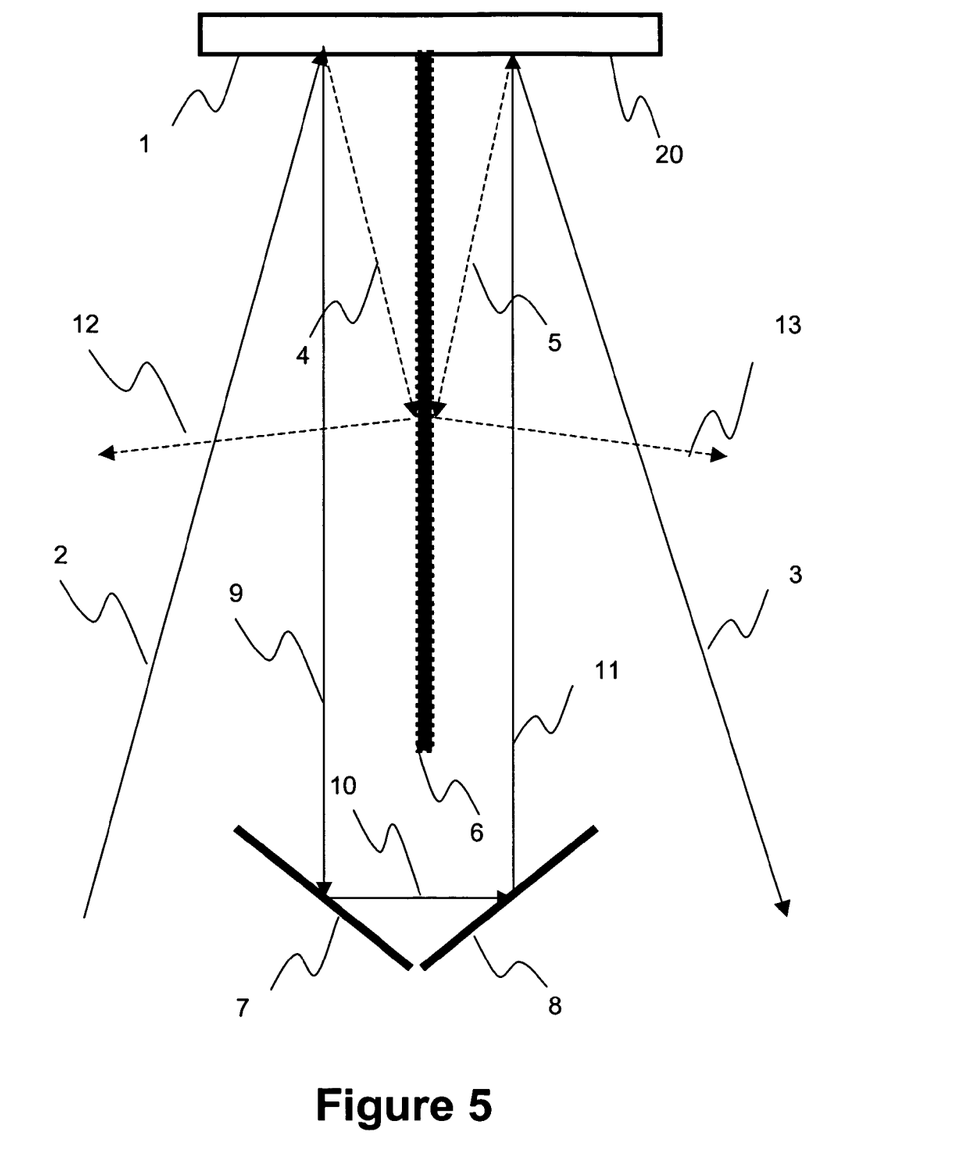
FIG. 5 is the same as FIG. 4 but with a different light path configuration. Other light path configurations are also possible.

FIG. 5 schematically depicts an embodiment functionally similar to that depicted in FIG. 4 but with a different configuration of the light paths.

Figure 6:
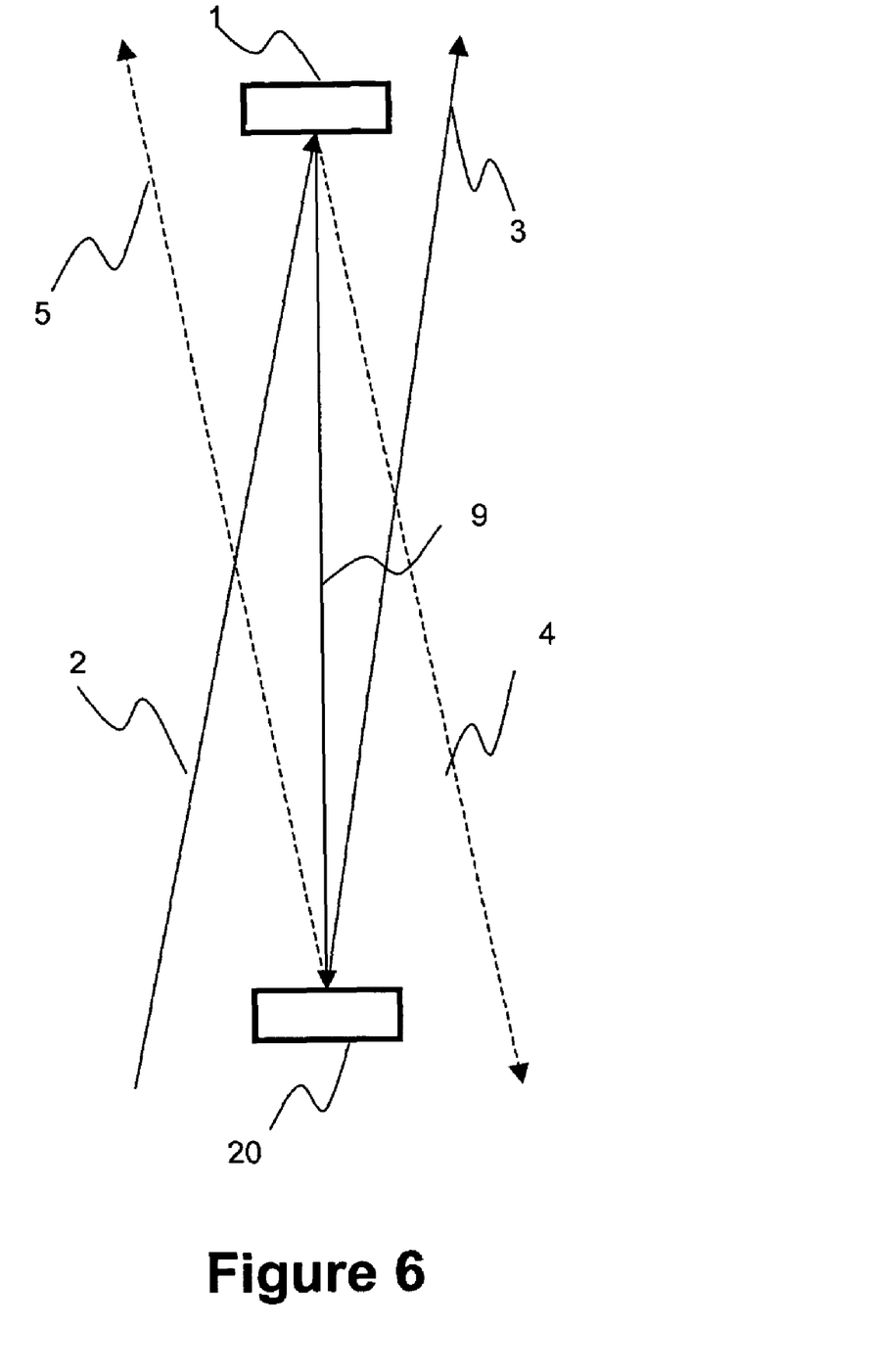
FIG. 6 is a schematic representation of an illumination exposure control system according to an embodiment comprising two pixelated SLMs.

FIG. 6 schematically depicts an embodiment where the first and second reflective pixelated SLMs are separate reflective pixelated SLMs. In this embodiment, the propagating light path 9 reflected by the first reflective pixelated SLM 1 is directed directly toward the second reflective pixelated SLM 20 and the propagating light path 3 reflected by the second reflective pixelated SLM 20 is directed toward the output port.

In most embodiments the non-propagating light paths can serve to exhaust unwanted energy, to provide alternate projection light paths, to provide detection light paths so that sampling of either the undesired light or the desired light can be obtained (the desired segment can be sampled because the on/off status of the pixels in the projection light path can be set to send the desired segment to the detector for analysis, then switched back to the projection light path).

In further aspects, methods comprise making the devices herein, and lighting an object such as a tissue sample, a tissue in vivo, a medical subject, or a non-medical object such as a scene. In some embodiments of lighting an object, the methods comprise a) directing a light beam along a light path and via a first pixelated SLM configured to accept the light beam, the first pixelated SLM configured to shutter to the light and pass substantially only desired light impinging on the first pixelated SLM as a partially shuttered light beam, and b) directing the partially shuttered light beam via a second pixelated SLM configured to accept the partially shuttered light beam from the first pixelated SLM and to pass substantially only desired light impinging on the second pixelated SLM as a post-shutter light beam. The first and second pixelated SLMs are operably connected to at least one controller containing computer-implemented programming that controls an on/off pattern of pixels in the first and second pixelated SLMs to display substantially the same shutter configuration and thus to simultaneously reject a substantially same pattern of non-desired light from the light beam or the partially shuttered light beam, respectively, and to pass desired light as the post-shutter light beam consisting substantially only of a desired selected light output.

The methods can further comprise, before directing the light beam past the second pixelated SLM, directing the light beam through a spectrum former such as a prism or diffraction grating to provide a spectrum from the light beam such that the post-shutter light beam consists essentially of a selected spectral output and a selected wavelength dependent intensity distribution. The light beam can be from a light source located in a same housing as and upstream from the first and second pixelated SLMs. The spectrum former can be at least one of a prism and a diffraction grating. The methods can further comprise passing the light beam by an optical element between the spectrum former and at least the second pixelated SLM to provide a substantially enhanced image of the spectrum. The methods can also comprise passing the post-shutter light beam by an optical projection device located downstream from the second pixelated SLM to project light as a directed light beam.

The post-shutter light beam can be selected to substantially mimic a spectral output and a wavelength dependent intensity distribution of at least one of a known lamp, a cathode ray tube image display device, a light emissive image display device, a source of optical radiation, or a natural ambient lighting scenario. The post-shutter light beam can also be selected to substantially mimic a spectral output and a wavelength dependent intensity distribution of output energy for disease treatment, photodynamic therapy, or disease diagnosis. The first and second pixelated SLMs can reflective SLMs such as digital micromirror devices, transmissive SLMs, and mixtures thereof; there can also be more than two SLMs. The first and second pixelated SLMs can also be different portions of a single reflective pixelated SLM, which can be disposed substantially side-by-side with a light blocking barrier therebetween. The light blocking barrier can comprise at least one column of pixels of the single reflective pixelated SLM configured in an off position or a physical barrier that projects from the mirror, which projection can comprise at least one reflective prism array.

From the foregoing, it will be appreciated that, although specific embodiments have been discussed herein for purposes of illustration, various modifications may be made without deviating from the spirit and scope herein. Accordingly, the systems, methods, etc., herein include such modifications as well as all permutations and combinations of the subject matter set forth herein and is not limited except as by the appended claims.

What is claimed is:

1. A precise, rapid shutter system comprising: a) a first pixelated spatial light modulator (SLM) configured to accept light from a light source, the first pixelated SLM configured to shutter the light and pass substantially only desired light impinging on the first pixelated SLM as a partially shuttered light beam, b) a second pixelated SLM configured to accept the partially shuttered light beam from the first pixelated SLM and to pass substantially only desired light impinging on the second pixelated SLM as a post-shutter light beam, wherein the first and second pixelated SLMs are operably connected to at least one controller containing computer-implemented programming that controls an on/off pattern of pixels in the first and second pixelated SLMs to display substantially the same shutter configuration and thus to simultaneously reject a same pattern of non-desired light from the light source or first pixelated SLM, respectively, and to pass desired light as the post-shutter light beam consisting substantially only of a desired selected light output.

2. The rapid shutter system of claim 1 wherein the system further comprises a spectrum former located upstream from the first pixelated SLM and configured to provide a spectrum from the light source to the first pixelated SLM, and the first and second pixelated SLMs are configured to pass a desired segment of light consisting essentially of a desired selected spectral output and a desired wavelength dependent intensity distribution.

3. The rapid shutter system of claim 2 wherein the system further comprises the light source and the spectrum former comprises at least one of a prism and a diffraction grating.

4. The rapid shutter system of claim 1 wherein the first and second pixelated SLMs are reflective SLMs.

5. The rapid shutter system of claim 1 wherein the first and second pixelated SLMs are transmissive SLMs.

6. The rapid shutter system claim 1 wherein the first and second pixelated SLMs are different portions of a single reflective pixelated SLM.

7. The rapid shutter system of claim 6 wherein the first and second pixelated SLMs are disposed substantially side-by-side on the single reflective pixelated SLM with a light blocking barrier therebetween.

8. The rapid shutter system of claim 7 wherein the light blocking barrier comprises at least one column of pixels of the single reflective pixelated SLM configured in an off position.

9. The rapid shutter system of claim 7 wherein the light blocking barrier comprises at least one reflective prism array.

10. The rapid shutter system of claim 1 wherein the system further comprises an optical projection device located downstream from the first reflective pixelated SLM to project light out of the lighting system as a directed post-shutter light beam.

11. The rapid shutter system of claim 2 wherein the desired segment is selected to substantially mimic a spectral output and a wavelength dependent intensity distribution of output energy for disease treatment.

12. The rapid shutter system of claim 2 wherein the desired segment is selected to substantially mimic a spectral output and a wavelength dependent intensity distribution of output energy for photodynamic therapy.

13. The rapid shutter system of claim 2 wherein the desired segment is selected to substantially mimic a spectral output and a wavelength dependent intensity distribution of output energy for disease diagnosis.

14. The rapid shutter system of claim 2 wherein the desired segment is selected to substantially mimic a spectral output and a wavelength dependent intensity distribution of output energy that can enhance contrast for detection or discrimination of a desired object in a tissue.

15. A stand alone luminaire sized to project light and providing precise, rapid shuttering, the luminaire comprising a housing containing at least: a) a high output light source, b) a first pixelated spatial light modulator (SLM) configured to accept light from the light source, the first pixelated SLM configured to shutter to the light and pass substantially only desired light impinging on the first pixelated SLM as a partially shuttered light beam, c) a second pixelated SLM configured to accept the partially shuttered light beam from the first pixelated SLM and to passing substantially only desired light impinging on the second pixelated SLM as a post-shutter light beam, and, d) a projection system optically connected to and downstream from the pixelated SLM in the first direction, wherein the projection system projects the desired segment as a directed light beam to illuminate the scene, wherein the first and second pixelated SLMs are operably connected to at least one controller containing computer-implemented programming that controls an on/off pattern of pixels in the first and second pixelated SLMs to display substantially the same shutter configuration and thus to simultaneously reject a same pattern of non-desired light from the light source or first pixelated SLM, respectively, and to pass desired light as the post-shutter light beam consisting substantially only of a desired selected light output.

16. The luminaire of claim 15 wherein the system further comprises a spectrum former located upstream from the first pixelated SLM and configured to provide a spectrum from the light source to the first pixelated SLM, and the first and second pixelated SLMs are configured to pass a desired segment of light consisting essentially of a desired selected spectral output and a desired wavelength dependent intensity distribution.

17. The luminaire of claim 15 wherein the first and second pixelated SLMs are different portions of a single reflective pixelated SLM, and wherein the first and second pixelated SLMs are disposed substantially side-by-side on the single reflective pixelated SLM with a light blocking barrier therebetween.

18. The luminaire of claim 15 wherein the luminaire further comprises a detector optically connected to and downstream from at least one of the pixelated SLMs, the detector also operably connected to a controller containing computer-implemented programming configured to determine from the detector whether at least one of the partially shuttered light beam and the post-shutter light beam contains a desired selected spectral output and a desired wavelength dependent intensity distribution, and adjust the on/off pattern of pixels in at least one of the pixelated SLMs to improve the correspondence between the desired segment and the desired selected spectral output and the desired wavelength dependent intensity distribution.

19. The luminaire of claim 18 wherein the luminaire further comprises a heat removal element operably connected to the light source to remove undesired energy emitted from the light source toward at least one of the reflective pixelated SLM, the optical element, and the spectrum former.

20. The luminaire of claim 15 wherein the system further comprises a spectral recombiner optically connected to and located downstream from the second pixelated SLM.

* * * * *